United States Patent [19]

Thomas et al.

[11] 4,158,855
[45] Jun. 19, 1979

[54] DROPOUT COMPENSATOR WITH PROPORTIONAL DURATION DROPOUT DETECTOR

[75] Inventors: Robert G. Thomas, Philadelphia, Pa.; Koichi Sadashige, Berlin, N.J.

[73] Assignee: RCA Corporation, New York, N.Y.

[21] Appl. No.: 855,709

[22] Filed: Nov. 29, 1977

[51] Int. Cl.² .............................................. H04N 5/76
[52] U.S. Cl. ...................................... 358/127; 360/38
[58] Field of Search .................... 360/38, 33; 358/127, 358/8

[56] References Cited

U.S. PATENT DOCUMENTS

| | | |
|---|---|---|
| 3,461,230 | 8/1969 | Hodge ..................................... 360/38 |
| 3,571,525 | 3/1971 | Miller ..................................... 360/38 |
| 3,912,858 | 10/1975 | Kenney .......................... 179/100.3 V |
| 3,947,873 | 3/1976 | Buchan ................................... 360/38 |
| 4,017,895 | 4/1977 | Oprandi ................................. 360/38 |
| 4,038,686 | 7/1977 | Baker ..................................... 360/38 |

Primary Examiner—Bernard Konick
Assistant Examiner—Alan Faber
Attorney, Agent, or Firm—Eugene M. Whitacre; Paul J. Rasmussen; Robert L. Troike

[57] ABSTRACT

A signal defect compensator is provided which develops a replacement video signal for use during a signal dropout. The compensator includes a dropout pulse detector for the generation of a stretched dropout control pulse interval proportional to the duration of the signal dropout.

3 Claims, 4 Drawing Figures

DROPOUT COMPENSATOR WITH PROPORTIONAL DURATION DROPOUT DETECTOR

BACKGROUND OF THE INVENTION

This invention relates to a signal defect compensator which may be used in a system for reproducing recorded television image information.

In the reproduction of television video signals from information recorded, for example, on magnetic tape, magnetic discs or other types of recording media, a decrease or loss of the recorded signal information may be encountered, which is apparent to the viewer as a degraded picture. A principle form of such a defect is known as a dropout which may occur due to imperfections in the recording media or an accumulation of dirt or other debris at the junction where the playback/recording heads and the media meet. When such a dropout occurs, the signal recovered from the media generally suffers a sharp reduction in amplitude which appears in the picture seen by the viewer as random black and white streaks or flashes on the screen of the television receiver or other means utilized as a reproducer. In severe cases, such a dropout may occur for one or more entire lines of the television picture.

Since it is known that television image information is to some extent redundant from line to line, dropout compensators (DOC) have generally operated on the principle that since the image information is redundant from line to line, it is possible to compensate for a dropout by substituting information from a previous image line during the duration of the dropout. Known defect compensators, therefore, store image information from a previous line and insert the stored previous line information into the output video signal when a signal dropout occurs.

The loss of signal, generally characterized as a dropout, is typically detected by a signal amplitude detector circuit which produces a pulse with a duration corresponding to the loss of signal. The dropout pulse after suitable processing is utilized to operate a switching circuit which inserts the previously stored line information for the duration of the signal dropout. Signal dropout detectors of the form described above exhibit difficulty in accurately defining the actual signal dropout due to the nature of the video signal recovery from the recorded medium. Video playback systems generally contain de-emphasis circuits in the form of resistor-capacitor networks which are designed to compensate for the signal response of the recording medium. When a signal amplitude loss occurs, the de-emphasis circuits tend to integrate the signal amplitude changes so that short duration signal dropouts, which contain relatively little energy or lengthened only slightly, while long duration signal dropouts contain sufficient energy to fully charge the capacitors of the de-emphasis circuit to the peak amplitude of the signal disturbance, thereby causing the signal disturbance seen by the dropout detector circuit to persist beyond the actual signal dropout duration. Present defect compensation systems attempt to overcome this problem by stretching the dropout pulse by a comparatively long fixed duration that is sufficient to accommodate the expected worst case signal amplitude change. However, the amount of fixed pulse stretching required for a worst case condition is now excessive for short duration dropouts and causes a severely degraded picture quality where a series of short duration dropouts occur in close succession. The problem becomes even more severe where the short duration dropouts occur in time near the critical elements of the television waveform, such as sync and burst, where the extended dropout pulse may cause loss of these critical timing waveform elements. The present invention overcomes this problem by providing a proportional duration pulse stretching of the dropout pulse to compensate for the effects of the video signal recovery circuits.

SUMMARY OF THE INVENTION

A video signal processing system is provided for dropout compensation of a video signal by substituting a replacement signal for the video signal during the duration of the dropout. The sytem comprises means responsive to the video signals for developing a source of replacement video signals. Means are responsive to the video signals for generating a first signal of a duration equal to the signal dropout. Means are responsive to the first signal for developing a stretched dropout control signal of a varying duration proportional to the duration of the first signal. Switch means coupled to the video signals and to the source of replacement video signals are responsive to the stretched dropout control signal for substituting one of the video signals or the replacement video signals for the other in the presence of the stretched dropout signal.

DESCRIPTION OF THE INVENTION

Figure 1:
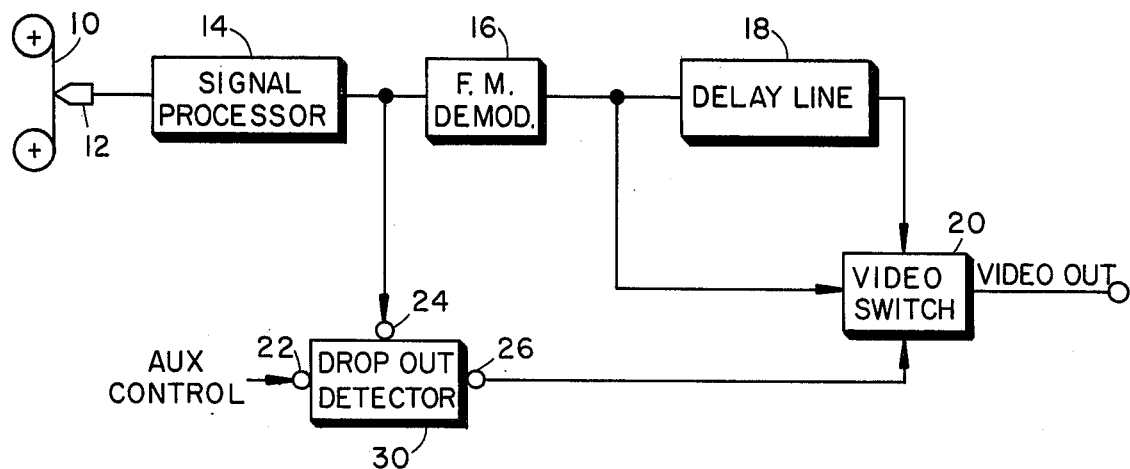
FIG. 1 is a block diagram of a dropout compensator embodying the present invention.

In FIG. 1, a recorded medium 10, for example, a magnetic tape containing video information recorded by frequency modulation (FM), is caused to pass by a video playback head 12 which recovers the information previously recorded on the medium 10. The recovered FM video information is coupled to the input terminal of a signal processor 14 which contains, for example, de-emphasis circuits which compensate for the frequency response of the recorded medium. The output of the signal processor in the form of an FM signal is coupled to the input terminal of an FM demodulator and to an input terminal 24 of a dropout detector circuit 30. The output signal from FM demodulator 16 is coupled to the input terminal of a delay line 18 of known form and to one input of a video switch 20. Delay line 18 generally has a delay time of 63.5 microseconds which corresponds to one television line (NTSC standards). The output of delay line 18 is coupled to one input of a video switch 20. The output terminal 26 of dropout detector 30 is coupled to the control terminal of video switch 20. In operation, the demodulated recovered video signal at the output of FM demodulator 16 is coupled to delay line 18, where it is stored for possible use as a replacement signal and directly to video switch 20. In the absence of a dropout detector 30 output pulse, the direct video is coupled to the video-out terminal by video switch 20. When a dropout indicated by a loss of FM signal amplitude occurs, the dropout detector 30 generates a control pulse which operates video switch 20 to substitute the video signal representing the previous television line stored in delay line 18 for the duration of the dropout.

Figure 2:
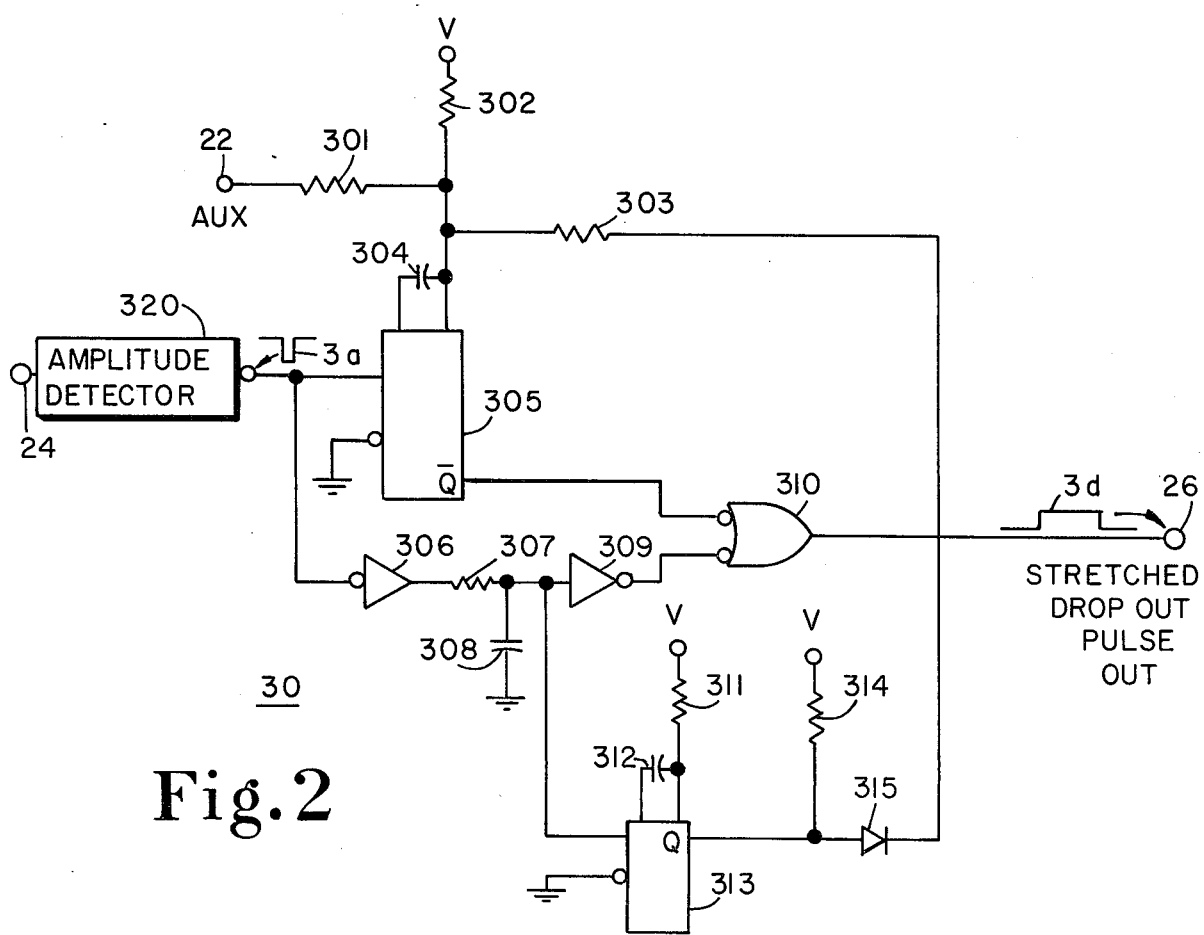
FIG. 2 is a schematic diagram of a dropout detector circuit embodying the present invention.

FIG. 2 illustrates an embodiment, partially in block diagram form, of dropout detector 30, in accordance with the present invention, which overcomes the problem of a fixed duration stretching of the dropout pulse. In FIG. 2, the FM signal recovered from the recording medium is coupled to an input terminal 24 which is, in turn, coupled to an amplitude detector 320, shown in block form, which senses the amplitude of the FM signal in a known manner, for example, the incoming FM signal amplitude is compared against a known reference level so that an output pulse, as illustrated by waveform 3a, appears at the output of the amplitude detector. The pulse, illustrated by waveform 3a, will generally be of fixed amplitude but varying duration depending on the time duration of the signal dropout. The remaining portion of FIG. 1, shown in schematic form, provides the proportional duration dropout control pulse to operate video switch 20 in accordance with the invention as follows. The negative-going signal pulse output of amplitude detector 320 (waveform 3a), having a width corresponding to the duration of the signal dropout, is coupled to one input of a NOR gate 310 through an inverter 306, an integrator network comprising resistor 307 and capacitor 308, and an inverter 309, as illustrated by waveform 3c. The output of amplitude detector 320 is also coupled to the input of a multivibrator 305. Integrator network 307, 308 produces a short delay to compensate for the propagation delay of multivibrator 305 to insure proper operation of NOR gate 310, as illustrated at time $t_3$ of the waveforms 3b and 3c. Multivibrator 305 is triggered on by the positive-going trailing edge of the input pulse (waveform 3a) and triggered off at the end of the interval determined by the period of multivibrator 305, as shown in waveform 3b. The output of multivibrator 305 is coupled to the other input of NOR gate 310. The output of NOR gate 310 is a positive-going waveform of stretched duration $t_1$–$t_4$, as illustrated by waveform 3d. The proportional stretching interval of input pulse 3a to produce output pulse 3d is determined by the period of multivibrator 305 in conjunction with multivibrator 313 as follows.

The output of integrator network 307, 308 is coupled to the input of multivibrator 313, whose Q output is coupled to the time constant components 302, 304 of multivibrator 305 via a diode 315 and resistor 303. There are two possibilities for the period of multivibrator 305 under this circuit arrangement. Under this circuit arrangement when the Q output of multivibrator 313, which is coupled to the output of integrator network 307, 308, is low, the period of multivibrator 305 is determined by the time constant of resistor 302 and capacitor 304 ($R_{302}$ $C_{304}$). When the Q output of multivibrator 313 is high, the period of multivibrator 305 is determined by the time constant of capacitor 304, resistor 302, and resistor 311 ($C_{304}$ $R_{302}$ $R_{311}$) divided by resistor 302 plus resistor 311 ($R_{302}$+$R_{311}$), thus the amount of stretching added to the output pulse is controlled by the production of time multivibrator 313 is on, during the period of multivibrator 305, which is determined, in turn, by resistor 311 and capacitor 312 ($R_{311}$ $C_{312}$).

Figure 3:
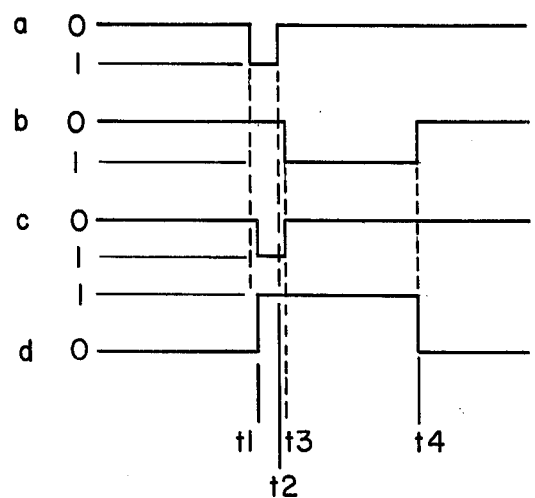
FIG. 3 illustrates waveforms depicting the operation of the dropout detector of FIG. 2.
Figure 4:
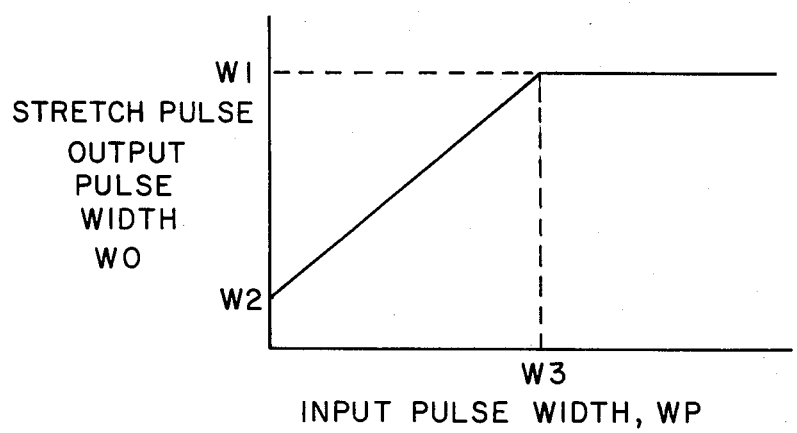
FIG. 4 is a graphical representation of the operation of the circuit of FIG. 2.

FIG. 4 is a graphical representation of the operation of the circuit arrangement of FIG. 3 in accordance with the following mathematical time constant or period relationships.

$$W_1 = K_1 R_{302} C_{304}$$

-continued $$W_2 = K_2 \frac{R_{302} R_{311}}{R_{302} + R_{311}} \cdot C_{304}$$

$$W_3 = K_2 R_{311} C_{312}$$

and:

$$W_o \Big|_0^{W_3} = W_2 (W_1 W_2) \frac{W_p}{W_3}$$

where:
$W_1$ equals the maximum amount of pulse stretching;
$W_2$ equals the minimum amount of pulse stretching;
$W_3$ equals the proportional stretch interval;
$W_o$ equals the stretched output pulse width;
$W_p$ equals the input pulse width; and
$K_1$, $K_2$ are constants Diode 315, in the output of multivibrator 313, ensures that resistor 303 is completely disconnected from the timing circuit ($R_{302}$ $R_{304}$) when multivibrator 313 is off (Q at a low). Resistor 314 ensures that resistor 303 will be returned to the +V voltage source when multivibrator 313 is on (Q at a high). Resistor 301, coupled from AUX terminal 22, provides a means of additional stretching of the dropout pulse (waveform 3d) by further modifying the time constant or period of multivibrator 305 by an external control applied to terminal 22. Additional stretching may be desirable to meet varying recording standards, as well as to provide further control of the timing of the replacement video signal in response to signal processing requirements.

What is claimed is:

1. A video signal processing system for providing dropout compensation for a video signal comprising:
    a source of video signals;
    means responsive to said source of video signals for developing a source of replacement video signals;
    means responsive to said source of video signals for generating a first signal of a duration equal to said signal dropout;
    means responsive to said first signal for developing a stretched dropout control signal of a duration equal to said first signal plus a varying stretched duration proportional to the duration of said first signal; and
    switch means coupled to said source of video signals and to said source of replacement video signals being responsive to said stretched dropout control signal for substituting one of said source of video signals or said replacement video signals for the other in the presence of said stretched dropout signal.

2. A video processing system according to claim 1 wherein said means for developing said stretched dropout signal includes;
    a first multivibrator responsive to said first signal having a first time constant for developing a first output pulse of a first period;
    a second multivibrator responsive to said first signal having a second time constant for developing a second output pulse of a second period; and
    means coupling said second output pulse to said first multivibrator for altering the time constant of said first multivibrator so as to stretch the period of said first output pulse in proportion to the period of said second output pulse.

3. A video processing system according to claim 2 wherein said first multivibrator includes means for further altering said first time constant so as to further stretch the period of said first output pulse in response to an external control signal.

* * * * *

UNITED STATES PATENT AND TRADEMARK OFFICE
CERTIFICATE OF CORRECTION

PATENT NO. : 4,158,855

DATED : June 19, 1979

INVENTOR(S) : Robert G. Thomas and Koichi Sadashige

It is certified that error appears in the above-identified patent and that said Letters Patent is hereby corrected as shown below:

Column 3, line 59 - "production" should be proportion

Column 4, line 10 - equation is missing + and - should be $$W_o \left. \begin{matrix} W_3 \\ \\ o \end{matrix} \right| = W_2 + (W_1 - W_2) \frac{W_p}{W_3}$$

Signed and Sealed this

Second Day of October 1979

[SEAL]

Attest:

RUTH C. MASON
*Attesting Officer*

LUTRELLE F. PARKER
*Acting Commissioner of Patents and Trademarks*